(12) United States Patent
Anthony et al.

(10) Patent No.: US 8,729,749 B2
(45) Date of Patent: May 20, 2014

(54) COOLING ARRANGEMENT FOR A MAGNETIC GEARBOX

(75) Inventors: John E. Anthony, Derby (GB); Ellis Chong, Derby (GB)

(73) Assignee: Rolls-Royce PLC, London (GB)

( * ) Notice: Subject to any disclaimer, the term of this patent is extended or adjusted under 35 U.S.C. 154(b) by 293 days.

(21) Appl. No.: 13/353,661

(22) Filed: Jan. 19, 2012

(65) Prior Publication Data

US 2012/0194015 A1 Aug. 2, 2012

(30) Foreign Application Priority Data

Feb. 1, 2011 (GB) .................................. 1101678.9

(51) Int. Cl.
*H02K 9/00* (2006.01)
(52) U.S. Cl.
USPC .............................................. 310/59; 310/52
(58) Field of Classification Search
USPC ............. 310/52, 54, 58, 59, 61, 64, 103, 112, 310/113, 114
See application file for complete search history.

(56) References Cited

U.S. PATENT DOCUMENTS

| | | | | |
|---|---|---|---|---|
| 8,482,171 | B2 * | 7/2013 | Edwards | 310/68 C |
| 2010/0283345 | A1 * | 11/2010 | Atallah et al. | 310/114 |
| 2011/0121672 | A1 * | 5/2011 | Calverley et al. | 310/103 |
| 2011/0121674 | A1 * | 5/2011 | Bright et al. | 310/103 |
| 2011/0156518 | A1 * | 6/2011 | Bright | 310/103 |

FOREIGN PATENT DOCUMENTS

| | | |
|---|---|---|
| EP | 1 353 436 A2 | 10/2003 |
| GB | 2 437 568 A1 | 10/2007 |
| GB | 2 457 226 A | 8/2009 |
| GB | 2 457 682 A | 8/2009 |
| SU | 468340 | 5/1975 |
| SU | 1697199 A1 | 12/1991 |
| WO | WO 2009/003993 A1 | 1/2009 |
| WO | WO 2009/087408 A2 | 7/2009 |
| WO | WO 2009/138725 A2 | 11/2009 |
| WO | WO 2009/138728 A2 | 11/2009 |

OTHER PUBLICATIONS

Atallah, K. et al., "A Novel High-Performance Magnetic Gear," *IEEE Transactions on Magnetics*, Jul. 2001, pp. 2844-2846, vol. 37, No. 4.
Atallah, K. et al., "A Novel 'Pseudo' Direct-Drive Brushless Permanent Magnet Machine," *IEEE Transactions on Magnetics*, Nov. 2008, pp. 4349-4352, vol. 44, No. 11.
British Search Report issued in British Application No. GB1101678.9 on Apr. 26, 2011.

* cited by examiner

*Primary Examiner* — Hanh Nguyen
(74) *Attorney, Agent, or Firm* — Oliff PLC

(57) ABSTRACT

This invention relates to a magnetic gearbox, comprising: an inner rotor having a first plurality of magnetic flux sources; an outer rotor having a second plurality of magnetic flux sources; and, a modulator having a plurality of pole pieces positioned between the first and second magnetic flux sources and separated from each by an air gap, wherein upon relative rotation of the inner rotor, outer rotor and modulator the first and second magnetic flux sources and pole pieces are arranged to provide a modulated magnetic field in the air gap adjacent each rotor; wherein either or both of the modulator and inner rotor include at least one nozzle for directing fluid radially across the respective air gap so as to impinge on the adjacent rotor or modulator.

12 Claims, 2 Drawing Sheets

COOLING ARRANGEMENT FOR A MAGNETIC GEARBOX

This invention relates to magnetic gearbox having a cooling arrangement.

FIG. 1 shows a schematic cross section of a known magnetic gearbox 10. The magnetic gearbox 10 includes an inner rotor 12, an outer rotor 14 and a modulator 16 which are substantially cylindrical and mounted concentrically so as to rotate relative to one another about a longitudinal axis of the gearbox. In the example provided in FIG. 1, the outer rotor 14 is held in a stationary position with the modulator 16 and inner rotor 12 coupled respectively to a rotating mechanical drive and load. However, the skilled person will appreciate that the inner 12 and outer 14 rotors could be configured to rotate with the modulator 16 being held stationary.

The inner 12 and outer 14 rotors include a plurality of magnetic flux sources in the form of permanent magnets 18, 20 which are separated from the modulator by respective air gaps 22, 24. The modulator 16 includes a plurality of laminated high permeability pole pieces 26 which are rectangular in cross section and evenly spaced about the circumference of the modulator 16.

The operation of typical magnetic gearboxes are described in "A Novel High-Performance Magnetic Gear", K Atallah, D Howe, IEE transactions on magnetics, July 2001, and "A Novel "Pseudo" Direct-Drive Brushless Permanent Magnet Machine" K Atallah, J Rens, S Mezani, D Howe IEE transactions on magnetics, November 2008. To summarise with reference with FIG. 1, the arrangement of the permanent magnets 18, 20 on the inner 12 and outer 14 rotors and the magnetic interaction with the pole pieces 26 results in a modulated magnetic field within the air gap 22, 24 adjacent each rotor 12, 14. The modulation created by the pole pieces 26 is such that the magnetic field in each air gap 22, 24 coarsely corresponds to the pole number and distribution of the respective rotor 12, 14. Hence, when either of the inner rotor 12 or modulator 16 is rotated, the other is synchronously rotated with the modulated magnetic field at a geared speed ratio. Depending upon the numbers of the permanent magnets 18, 20 and pole pieces 26, it is possible to provide a geared rotation which can be contra rotating or co rotating. By geared rotation it is meant that a change of rotational speed occurs between the relatively rotating parts.

On the small scale, thermal management is not a significant concern in existing magnetic gearboxes for a number of reasons. Firstly, the size of the components is small making for low thermal resistances; secondly, the cooling mechanisms are relatively simple to implement due to the small size (e.g. a single axial fan blowing air through the air gaps); and thirdly, the laminations which can be used to construct the machine can be minimal in thickness which helps reduce eddy current losses.

However, these geometrically originating advantages do not generally apply to magnetic gearboxes required to convert hundreds of kilo Newton meters of torque (or hundreds of kilo Watts or Mega Watts of power) because economic considerations begin to outweigh the engineering requirements. For example, the minimum segmentation length for magnetic materials will be limited by cost rather than eddy current minimisation. Hence, the heat generation inside the machine, particularly in the permanent magnets, will be detrimental to the machine performance if not adequately removed.

This invention seeks to address the cooling of magnetic gearboxes, particularly large, high powered magnetic gearboxes.

In a first aspect, the present invention provides a magnetic gearbox, comprising: an inner rotor having a first plurality of magnetic flux sources; an outer rotor having a second plurality of magnetic flux sources; and, a modulator having a plurality of pole pieces positioned between the first and second magnetic flux sources and separated from each by an air gap, wherein upon relative rotation of the inner rotor, outer rotor and modulator the first and second magnetic flux sources and pole pieces are arranged to provide a modulated magnetic field in the air gap adjacent each rotor; wherein either or both of the modulator and inner rotor include at least one nozzle for directing fluid radially across the respective air gap so as to impinge on the adjacent rotor or modulator.

The invention provides nozzles which can direct air radially on to the surface of the magnets, rather than providing a substantially axial air flow with the use of a fan blade which is the conventional approach in electrical machines. This generally provides for a superior convective heat transfer and a resulting improved cooling of the components. Further, it is possible to tailor the distribution of the cooling air such that a uniform reduction in heat can be achieved throughout the axial length of the machine which may vary in its cooling requirement.

The fluid can be a gas or a liquid. Preferably, the fluid is a gas. More preferably, the gas is pressurised air.

The inner rotor and modulator can be mounted so as to rotate relative to each other and the outer rotor. Alternatively, the inner rotor or modulator could be held in a stationary position.

Preferably, the magnetic flux sources are permanent magnets. Alternatively, the magnetic flux sources can be electromagnets.

The modulator can include at least one conduit. The conduit can be a tube. Alternatively, the conduit can include a wall. A portion of the conduit can include the at least one pole piece. The conduit can be a cavity within the pole piece or a cavity within the parts of the modulator which supports the pole pieces. The tube can be partially surrounded by the at least one pole piece. The pole pieces can be constructed from a series of laminations. The conduit can be snugly received within an aperture in the at least one pole piece so as to provide mechanical support to the pole piece. The aperture can be one or more of a hole, slit or groove.

When the pole pieces are constructed from laminations the conduits and nozzles can be formed from through-holes and slots in the laminations, respectively.

The conduit can include an internal support member for supporting the at least one pole piece. The support member can compartmentalise the conduit to provide multiple passages in which air can flow.

The nozzles can be apertures in a wall of the conduit. The apertures can be round. For example, the apertures can be circular or oval. The apertures can be substantially square or rectangular. Alternatively, the apertures can be elongate slots. The nozzles can be substantially the same size. Alternatively, the size of the nozzles can be varied according to the position within the magnetic gearbox and the cooling requirement at that position.

The nozzle density can be substantially constant on one or both of the circumferential surfaces of the modulator. The conduits can be evenly spaced around the circumference of the or each air gap. The nozzles can be evenly distributed along the axial length of the modulator. Alternatively, the nozzles can be non-uniformly distributed along the axial length of the modulator.

The modulator can be mounted on a shaft comprising a cavity which is connectable to a source of compressed air. The nozzles can be in fluid communication with the cavity.

The magnetic gearbox can further comprise bearings for rotational support of one or more the inner rotor, modulator or outer rotor. The shaft, radial member passageways or conduit can further comprise at least one nozzle adjacent to the or each bearing.

The magnetic gearbox can further comprise a casing which houses the inner rotor, modulator and outer rotor. The casing can include exhaust vents for exhausting air which has passed through the nozzles. The outer rotor can be a portion of the casing.

Embodiments of the present invention will now be described with the aid of the following drawings in which.

Figure 1:
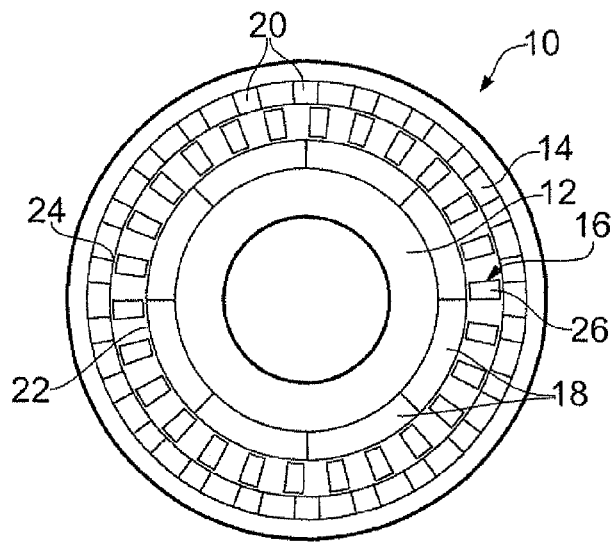
FIG. 1 shows a cross section of the known magnetic gearbox described above. This does not form part of the invention and is included for the purpose of understanding the invention only.
Figure 2:
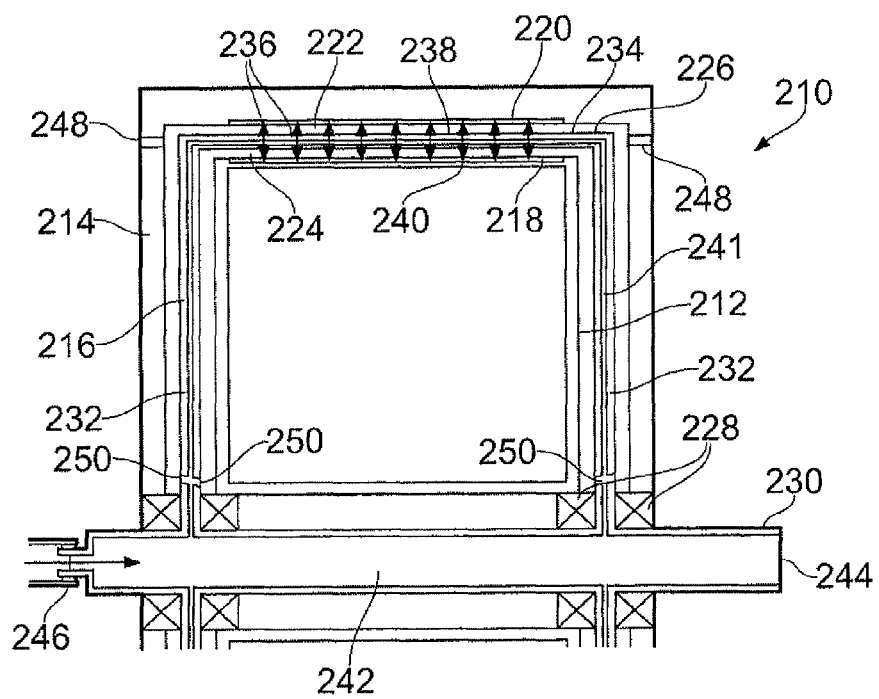
FIG. 2 shows a section taken along the longitudinal axial of a magnetic gearbox of the present invention.

The magnetic gearbox 210 shown in FIG. 2 includes an inner rotor 212, an outer rotor 214 and a modulator 216. The inner 212 and outer 214 rotors each include pluralities of magnetic flux sources in the form of permanent magnets 218, 220. The inner rotor 212 includes four pole pairs, the outer rotor twenty-two pole pairs. The modulator 216 includes twenty-six pole pieces in the form of discrete high permeability longitudinal members having a substantially rectangular cross section which are evenly spaced around the circumference of the modulator 216 (as shown in FIG. 1). The modulator 216 includes a support structure (not shown) for holding the pole pieces 226 in place. The support structure is constructed from a non-magnetic material.

The inner rotor 212 and modulator 216 are mounted on bearings 228 so as to be rotatable relative to each other and to the outer rotor 214, which is fixed so as to be stationary during use. The modulator 216 is mounted on a central shaft 230 which lies along the longitudinal axis of the magnetic gearbox 210 and provides the axis of rotation. Radial members 232 extend from the central shaft 230 to provide mechanical support for the pole pieces 226 which run along the length of the magnetic gearbox 210. The skilled person will appreciate that the radial members may be flanges or spokes so long as the necessary support is provided as per the specific application.

The modulator 216 includes a plurality of axial conduits 234 which are arranged longitudinally around the circumference of the modulator 216. The conduits 234 include a plurality of nozzles in the form of apertures 236 placed on the inner 238 and outer 240 circumferential surfaces of the pole pieces so as to open the conduit 234 to the respective air gaps 224, 222 of the inner 212 and outer 214 rotors. The ends of the conduit 234 within each pole piece 226 are connected to passageways 241 within the radial members. These passageways 241 are in turn connected to a cavity 242 within the shaft 230 which is coupled to a source of compressed air. The central shaft 230 is a hollow cylindrical member which is closed at a first end 244 and coupled to a source of compressed air via a rotating seal 246 at a second end. Having a network of passages arranged in this way allows for a single rotating air seal at one end of the shaft 230 thereby maximising the overall reliability of the magnetic gearbox 210.

The casing of the magnetic gearbox 210 of the embodiment shown in FIG. 2 is integral with the outer rotor 214 and includes exhausts in the form of apertures 248 to allow the air exited from the apertures 236 to escape.

In use, compressed air is provided to the shaft cavity 242 via the rotating seal 246. The air passes up each passageway 240 of the radial members 232 and along the pole piece 226, exiting through the apertures 236 into the air gaps 222,224. The compressed air impinges on the exposed pole face of the permanent magnets 218, 220 of the inner 212 and outer 214 rotors thereby cooling them before exiting through the exhaust vents 248. The local positioning of the apertures to the permanent magnets and the angle at which the air impinges on the permanent magnets increases turbulence and therefore heat transfer. Hence, a superior cooling function is provided. Further, the amount of air which is required to cool the machine can be reduced when compared to a traditional method of using an axial air flow created by a fan placed at one end of the machine. Hence, the invention increases efficiency.

The arrangement of the apertures 236 along the length of the conduits 234 is such that cooling is applied uniformly to the surface of the permanent magnets. Hence, the apertures 236 toward the centre of the magnetic gearbox 210 are larger than those towards the ends to account for the pressure drop along the axial length of the conduit 234. Also, the ratio of the passageways 240 in the radial members 232 and the cavity 242 is predetermined to allow an equal flow of air down each radial member 232. The conduits 234 can be arranged around the circumference of the modulator 216 as required by the cooling necessity of the magnetic gearbox 210. However, the skilled person will appreciate that a non-uniform distribution of cooling may be advantageous. Having a plurality of apertures 236 along the length of the rotors 212, 214, means that the temperature of the air which impinges on the surfaces of the permanent magnets does not vary as a function of axial distance along the magnetic machine. This is in contrast to conventional cooling techniques which rely on an axial flow of air.

The flow of air can be transported axially through the machine utilising the pole pieces 226, as described above, or through dedicated conduits in the supporting structure of the modulator 216. FIGS. 3a to 3d show some embodiments which can be utilised with the invention. The skilled person will appreciate that each will have its own advantages in terms of constructional convenience and magnetic performance.

Figure 3A:
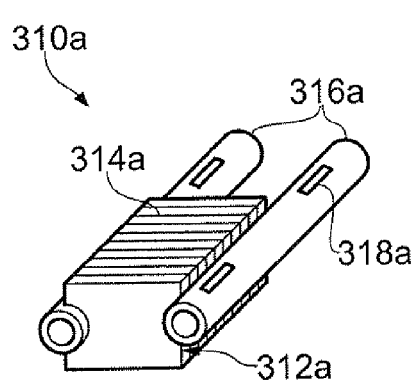
FIGS. 3a to 3d show various embodiments of the cooling structures used in the modulator In FIG. 2 there is shown a schematic cross section of a magnetic gearbox 210. The magnetic gearbox 210 can be assumed to be similar to the prior art example described with reference to FIG. 1 except where it is otherwise apparent.

FIG. 3a shows a laminated pole piece 310a having a substantially rectangular cross section with semicircular grooves running longitudinally along the mid line of its flanks 312a. In use, the laminated pole piece 310a would be secured on or within the modulator 216 such that that the parting line between the laminations 314a is aligned with the rotational direction of the magnetic gearbox 310a.

The semicircular grooves correspond to and receive conduits in the form of tubes 316a. However, the skilled person will appreciate that other groove profiles (and correspondingly-shaped support members) may be advantageous. The tubes 316a include nozzles in the form of elongate apertures 318a in the upper and lower (not shown) surfaces of the tubes 316a. The apertures 318a provide exits from the tubes 316a such that air can impinge on the surface of the permanent magnets 218, 220 of the inner 212 and outer 214 rotors. The tubes 316a can be fixed within the semicircular groove in any suitable manner for the materials chosen and the application of the machine. For example, the tubes 316a may be adhered in place with an epoxy resin or mechanically retained with strapping or ties.

Figure 3B:
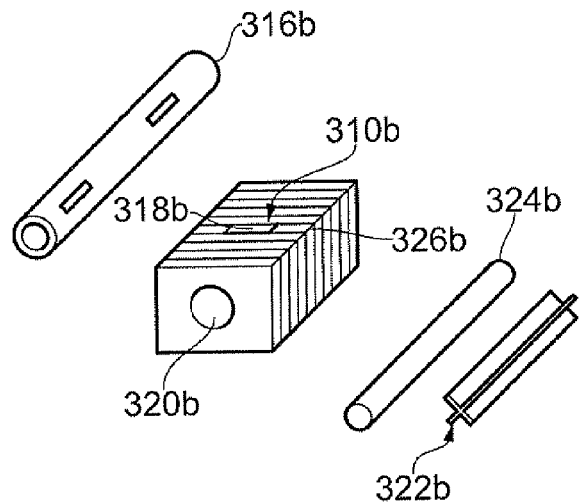

FIG. 3b shows an embodiment in which the pole piece 310b includes a hollow cylindrical cavity 320b which is sized and shaped to receive a tube 316b as described in the embodiment shown in FIG. 3a. Alternatively, the hollow cavity 320b can include a support member 322b which dissects and compartmentalises the hollow cavity 316b so as to provide separate channels through which air can flow. The skilled person will appreciate that other cavity profiles (and correspondingly-shaped support members) may be advantageous.

The support member 322b of the embodiment is cross shaped in cross section. However, the skilled person will appreciate that other cross sectional profiles may be advantageous. For example, a rod 324b having a diameter less than that of the cavity 320b can be used instead.

The use of an internal support member 322b which compartmentalises the conduit can be advantageous to control the distribution of the air flow within the modulator 216 to different areas as required. For example, where the heat generated is greater in either the inner 212 or outer rotor 214. In another embodiment, each rotor can be divided into a plurality of zones, each having a different thermal cooling requirement, and each having an individual cooling supply.

The upper and lower surfaces (as viewed in FIG. 3b) which provide the circumferential surfaces of the pole piece 310b has a "U" shaped lamination 326b which when stacked in series with rectangular laminations 314b with through-holes provide the nozzles 318b. The use of laminations 314b to form this construction is advantageous as each lamination 314b can readily have a through hole or slot punched in it when made. Further, groups of "U" shaped laminations 326b can be clumped together to provide different sized nozzles.

The embodiment shown in FIG. 3b is particularly advantageous as it provides axial support for the laminations. If the support were not there, it would be necessary to provide some form of support structure in place of the support member 316b, 322b, 324b.

Figure 3C:
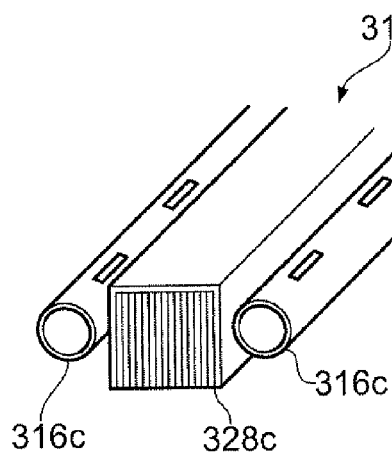

FIG. 3c shows a further embodiment of a conduit system within the modulator. Here, the pole piece 310c and conduits are kept separate from one another. Hence, the conduits are in the form of tubes 316c which flank the laminated pole piece 310c which is supported via a separate mechanical member 328c which forms part of the modulator 216. The tubes 316c are similar to those described in FIG. 3a.

Figure 3D:
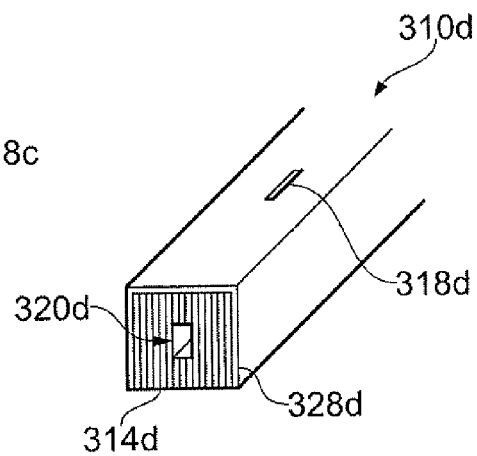

FIG. 3d shows a conduit in the form of an internal cavity 320d within the laminations of the pole piece. This embodiment is similar to that described in FIG. 3b, however, an ancillary support 328d, similar to that described in FIG. 3c, is required to retain the laminations 314d in place. It should be noted that the laminations in FIGS. 3c and 3d can be replaced by powdered high permeability soft magnetic composite (SMC) material and the direction of the laminations chosen as required by the electromagnetic performance of the machine.

Returning to FIG. 2, the radial members further include nozzles in the form of apertures 250 in the passageways 240. The apertures are angled with respect to the passageway 240 so as to direct compressed air onto the bearings 228 and keep them cooled in operation.

The skilled person will appreciate that the size and arrangement of the conduits, passageways, nozzles and cavity within the shaft will be highly dependent on the application of the magnetic gearbox, as will the pressure of the compressed air supplied to the central shaft.

The above embodiments are not to be taken as a limitation of the claims.

The invention claimed is:

1. A magnetic gearbox, comprising:
    an inner rotor having a first plurality of magnetic flux sources;
    an outer rotor having a second plurality of magnetic flux sources; and,
    a modulator having a plurality of pole pieces positioned between the first and second magnetic flux sources and separated from each by an air gap,
    wherein upon relative rotation of the inner rotor, outer rotor and modulator the first and second magnetic flux sources and pole pieces are arranged to provide a modulated magnetic field in the air gap adjacent each rotor;
    wherein either or both of the modulator and inner rotor include at least one nozzle for directing fluid radially across the respective air gap so as to impinge on the adjacent rotor or modulator.

2. A magnetic gearbox as claimed in claim 1 wherein the modulator includes at least one conduit and wherein the nozzles are apertures in a wall of the conduit.

3. A magnetic gearbox as claimed in claim 2 wherein the at least one conduit is at least partially surrounded by at least one pole piece.

4. A magnetic gearbox as claimed in claim 2 wherein a portion of a wall of the conduit is formed by at least one pole piece.

5. A magnetic gearbox as claimed in claim 4, wherein at least one pole piece is constructed from a series of laminations, wherein the conduits and nozzles are formed from through-holes and slots in the laminations, respectively.

6. A magnetic gearbox as claimed in claim 5 wherein the conduit is snugly received within an aperture in the at least one pole piece laminations so as to provide mechanical support for the pole piece laminations.

7. A magnetic gearbox as claimed in claim 2 wherein the conduit includes an internal support member for supporting the at least one pole piece.

8. A magnetic gearbox as claimed in claim 7 wherein the support member compartmentalises the conduit to provide multiple passages in which fluid can flow.

9. A magnetic gearbox as claimed in claim 1 wherein the modulator is mounted on a shaft comprising a cavity which is connectable to a source of compressed air, wherein the nozzles are in fluid communication with the cavity.

10. A magnetic gearbox as claimed in claim 1 wherein the nozzles are evenly distributed along the axial length of the modulator.

11. A magnetic gearbox as claimed in claim 1 further comprising bearings for rotational support of one or more the inner rotor, modulator or outer rotor, wherein the shaft, radial member passageways or conduit further comprises at least one nozzle adjacent to the bearing.

12. A magnetic gearbox as claimed in claim 1 further comprising a casing which houses the inner rotor, modulator and outer rotor, wherein the casing includes exhaust vents for exhausting air which has passed through the nozzles.

* * * * *